United States Patent [19]

De Zylva

[11] Patent Number: 4,805,391
[45] Date of Patent: Feb. 21, 1989

[54] TWINE TAIL COLLECTOR SYSTEM FOR AGRICULTURAL BALERS

[75] Inventor: Walter H. De Zylva, Victoria, Australia

[73] Assignee: Ford New Holland, Inc., New Holland, Pa.

[21] Appl. No.: 175,892

[22] Filed: Mar. 31, 1988

[30] Foreign Application Priority Data

Apr. 3, 1987 [AU] Australia ................................ PI1235

[51] Int. Cl.⁴ ............................................. A01D 59/04
[52] U.S. Cl. ....................................... 56/343; 56/12.8; 15/301; 289/2; 289/18.1
[58] Field of Search ..................... 56/12.8, 341, 343; 100/8, 90, 19 R, 31; 289/2, 18.1; 15/301, 314, 339

[56] References Cited

U.S. PATENT DOCUMENTS 3,486,309 12/1969 Wild ...................................... 15/301
4,676,277 6/1987 Gillespie et al. ....................... 15/301

OTHER PUBLICATIONS

New Holland Machine Co., Model 77 baler.

Primary Examiner—John Weiss
Attorney, Agent, or Firm—Darrell F. Marquette; Frank A. Seemar; Larry W. Miller

[57] ABSTRACT

A system for collecting twine tails on an agricultural baler includes a suction fan connected by hoses to mouth devices which partially envelop the knotters on the baler. Another hose connects the suction fan to a container. During operation, the suction fan acts to convey twine tails from the knotters into the container where they are collected. The container has an open mesh lid allowing egress of dust and small particles of debris but preventing egress of the twine tails and large particles of debris.

5 Claims, 3 Drawing Sheets

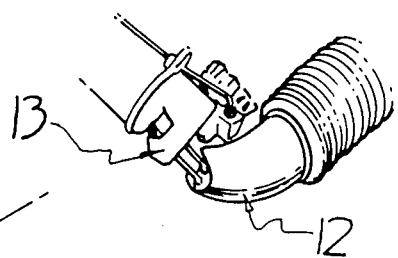
FIGURE. 1A
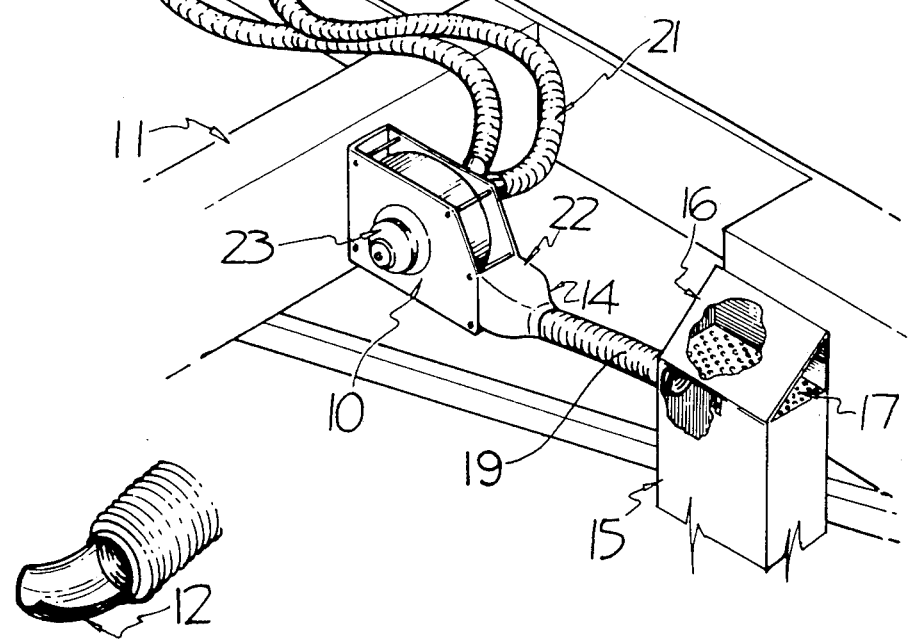
FIGURE. 1
FIGURE. 1B

4,805,391

TWINE TAIL COLLECTOR SYSTEM FOR AGRICULTURAL BALERS

BACKGROUND OF THE INVENTION

The present invention relates to agricultural balers, particularly of the rectangular bale type, utilizing twine to bind bales.

Agricultural balers utilizing automatic knotters have been available for many years. In use, such knotters, while being effective in binding bales with twine, result in small amounts of twine commonly known as twine tails being wasted after each knotting operation. Although the amounts of twine wasted are not great (i.e. twine tails approximately 3 to 8 cm long), they build up and may eventually cause knotter tying problems. The presence of twine tails has also been detected in wool during processing and manufacturing. The twine tails are usually black or of a dark color when synthetic twine is used, and if undetected, can be incorporated into the wool manufacturing and processing stages, at which point they are almost impossible to remove.

The twine tails from a knotting operation are sometimes picked up by the sheep in its fleece during feeding of the bale in the field, and may go undetected through the initial wool processing stages. Even the smallest scrap of twine in a bale of wool can render the finished fabric virtually worthless. It should be noted that scraps of synthetic twine are not readily broken down, as is twine manufactured from natural fibers.

The present invention has an object to provide an improvement in an agricultural baler in which knotter twine tails are collected.

SUMMARY OF THE INVENTION

There is provided according to the present invention in an agricultural baler of the type including a knotter for binding bales with twine, the improvement comprising suction means connected by duct means to the knotter and to a container, the duct means including mouth means at least partially enveloping the knotter to collect twine tails when in use, and the suction means acting to convey the twine tails to the container.

Conveniently, the suction means includes a fan having blades which are shaped so as to be unaffected by the twine tails and particles of debris drawn into the mouth means.

Conveniently, the container includes a lid of open mesh construction allowing egress of dust and small particles of debris but preventing egress of twine tails so that, in use, large particles of debris and twine tails are collected in the container.

DESCRIPTION OF THE DRAWINGS

The invention will be described in greater detail with a reference to the accompanying drawings in which:

FIG. 1 is a perspective view of the suction fan and the container;

FIG. 1A is an enlarged view of the mouth device partially enveloping the knotter;

FIG. 1B is an enlarged view of the mouth device; and

DESCRIPTION OF THE PREFERRED EMBODIMENT

Figure 2:
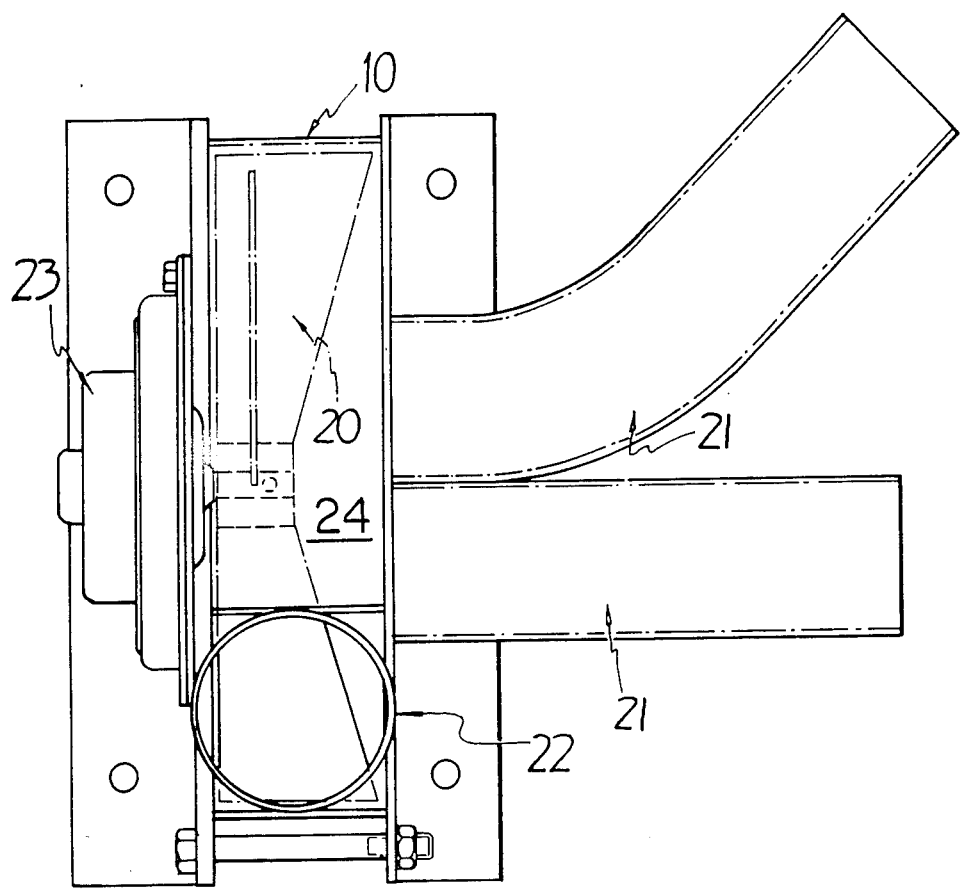
FIG. 2 and 3 are sectional elevation views of the suction fan.

With reference to FIGS. 1, 1A and 1B, a suction fan 10 is mounted on a suitable part of the framework of an agricultural baler 11 of the rectangular bale type. The fan 10 is connected by hoses 18 to mouth devices 12 partially enveloping the knotters 13 of the baler as shown so that the twine tails coming from the knotters 13 are collected in the mouth devices 12. The output side 14 of the suction fan 10 is connected by a hose 19 to a container 15 as shown. The hoses 18, 19 and the mouth devices 12 form duct means connecting the fan 10 to the knotters 13 and to the container 15.

The container 15 includes a pivotal lid 16 having an enclosing surface 17 of open mesh construction as shown. The surface 17 allows egress of dust and particles of debris but prevents egress of larger particles of debris and the twine tails. Therefore, the container 15 is not quickly filled with extraneous material but is effective in collecting the twine tails.

FIG. 1B shows a desired configuration of the mouth devices 12 constructed to at least partially envelop the knotters 13 in the vicinity of the point of ejection of the twine tail as best shown in FIG. 1A.

Figure 3:
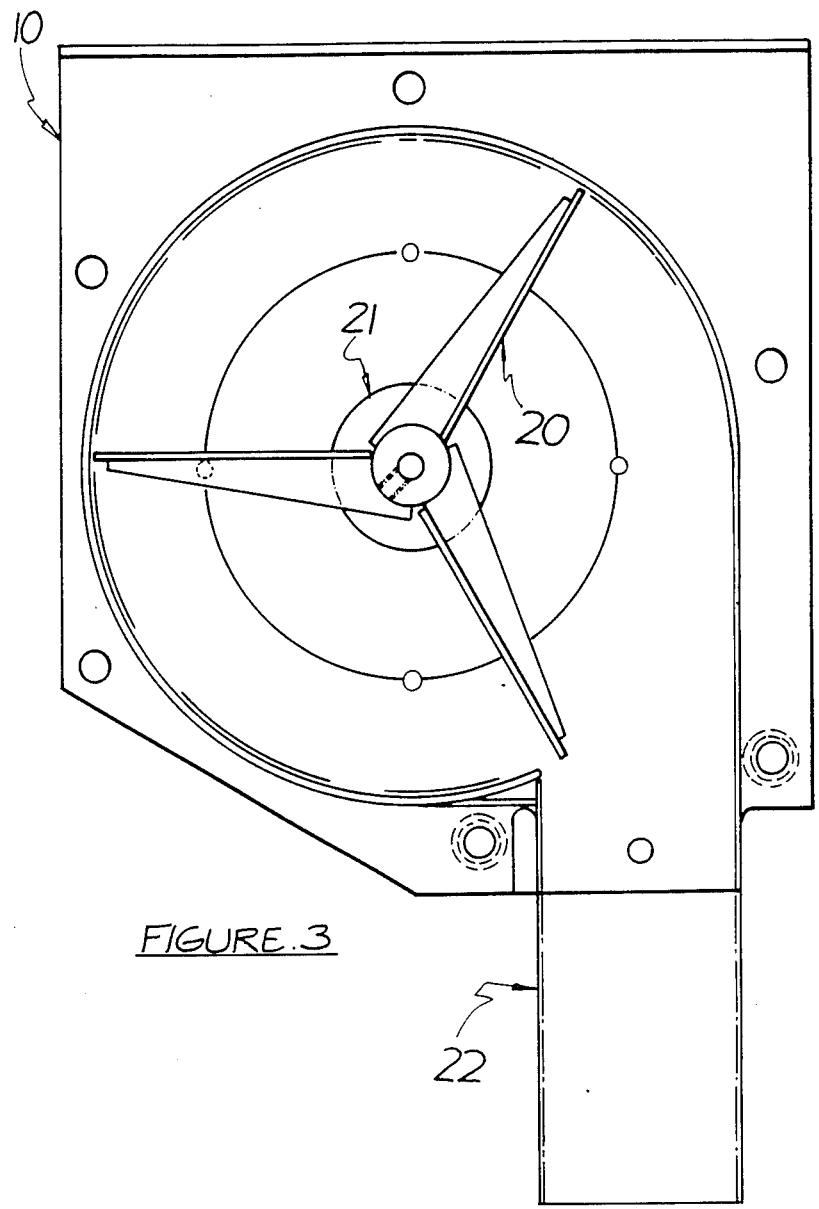

FIGS. 2 and 3 show sectional elevation views of the fan 10. The fan blades 20 are specially constructed to form an open space 24 adjacent the rotary axis of the fan 10 to facilitate flow of large amounts of debris to thereby minimize he chance of significant damage and blockage of the fan blades 20.

The suction fan includes axial inlet pipes 21 connected by the hoses 18 to the mouth devices 12 and a tangential outlet pipe 22 connected by hose 19 to the container 15. The separate inlet pipes 21 are arranged at the inlet to the fan 10 to minimize the chance of blockages occurring in the pipes 21. The suction fan 10 includes an axially mounted motor 23 for driving the fan blades 20.

Other alternatives are possible in the construction of the fan 10 and the container 15. For example, the container 15 may be positioned between the knotter 13 and the suction fan 10; that is, the container 15 may be positioned at or near the inlet of the suction fan 10.

What is claimed is:

1. In an agricultural baler of the type including a knotter for binding bales with twine, the improvement comprising suction means connected by duct means to the knotter and to a container, said duct means including mouth means at least partially enveloping the knotter to collect twine tails when in use, the suction means acting to convey said twine tails to the container.

2. The improvement defined in claim 1, wherein the suction means includes a fan having blades which are shaped so as to be unaffected by the flow of twine tails and debris drawn into said mouth means.

3. The improvement defined in claim 1, wherein the container includes a lid of open mesh construction allowing egress of duct and small particles of debris, but preventing egress of twine tails so that in use large particles of debris and twine tails are collected in said container.

4. The improvement defined in claim 2 wherein said fan blades are shaped to form an open space adjacent the rotary axis of the fan to facilitate flow of debris through the suction means in operation, and thereby minimize blockage and damage to the fan blades.

5. In an agricultural baler of the type including a knotter for binding bales with twine, the improvement comprising suction means connected by duct means to the knotter, said duct means including mouth means at least partially enveloping the knotter to collect twine tails when in use, the suction means acting to convey said twine tails through said duct means to a container, said suction means including a fan for creating a vacuum at said mouth means.

* * * * *